United States Patent
Zhang et al.

(10) Patent No.: US 12,074,407 B2
(45) Date of Patent: Aug. 27, 2024

(54) METHOD, DEVICE AND SYSTEM FOR DYNAMICALLY CONTROLLING GAIN OF RAMAN OPTICAL FIBER AMPLIFIER

(71) Applicant: Accelink Technologies Co., Ltd, Wuhan (CN)

(72) Inventors: Cuihong Zhang, Wuhan (CN); Chengpeng Fu, Wuhan (CN); Jintao Tao, Wuhan (CN); Hao Zhang, Wuhan (CN); Lijing Cheng, Wuhan (CN)

(73) Assignee: Accelink Technologies Co., Ltd., Wuhan (CN)

( * ) Notice: Subject to any disclaimer, the term of this patent is extended or adjusted under 35 U.S.C. 154(b) by 847 days.

(21) Appl. No.: 17/273,574

(22) PCT Filed: Dec. 26, 2018

(86) PCT No.: PCT/CN2018/123701
§ 371 (c)(1),
(2) Date: Mar. 4, 2021

(87) PCT Pub. No.: WO2020/048052
PCT Pub. Date: Mar. 12, 2020

(65) Prior Publication Data
US 2021/0344163 A1   Nov. 4, 2021

(30) Foreign Application Priority Data

Sep. 4, 2018   (CN) .......................... 201811028093.3

(51) Int. Cl.
*H01S 3/13* (2006.01)
*H01S 3/067* (2006.01)
(Continued)

(52) U.S. Cl.
CPC ...... *H01S 3/13013* (2019.08); *H01S 3/06754* (2013.01); *H01S 3/0912* (2013.01);
(Continued)

(58) Field of Classification Search
None
See application file for complete search history.

(56) References Cited

U.S. PATENT DOCUMENTS

| 8,797,640 B2 | 8/2014 | Fu et al. |
| 9,300,110 B2 * | 3/2016 | Griseri ............. H01S 3/094096 |

(Continued)

FOREIGN PATENT DOCUMENTS

| CN | 1416229 A | 5/2003 |
| CN | 101789829 A | 7/2010 |

(Continued)

OTHER PUBLICATIONS

Search Report for Chinese Application No. 2018110280933 issued Jul. 1, 2019; 2 pages.
(Continued)

*Primary Examiner* — Eric L Bolda
(74) *Attorney, Agent, or Firm* — Lei Fang, Esq.; Smith Tempel Blaha LLC (57) ABSTRACT

Disclosed are a method, device and system for dynamically controlling a gain of a Raman optical fiber amplifier. The method comprises: determining whether a target gain falls within a gain mask range; if the target gain falls within the gain mask range, directly locking a gain to the target gain; and if the target gain falls outside the gain mask range, locking the gain to a corresponding maximum gain in the gain mask range, and gradually increasing the locked gain according to a preset first step length until the target gain is reached or until at least one pump laser reaches a maximum output power. The invention enables an optical fiber amplifier to respond quickly to a change in an input optical signal, ensures gain stability, and ensures that no power overshoot or undershoot occurs in the non-switched optical channels in an optical path. Moreover, the invention minimizes an
(Continued)

amount of time required to complete switching between gains.

11 Claims, 4 Drawing Sheets

(51) Int. Cl.
*H01S 3/091* (2006.01)
*H01S 3/094* (2006.01)
*H01S 3/10* (2006.01)
*H01S 3/30* (2006.01)

(52) U.S. Cl.
CPC .. *H01S 3/094003* (2013.01); *H01S 3/094096* (2013.01); *H01S 3/10069* (2013.01); *H01S 3/302* (2013.01); *H01S 2301/02* (2013.01)

(56) References Cited

U.S. PATENT DOCUMENTS

| | | |
|---|---|---|
| 9,577,403 B2 | 2/2017 | Griseri et al. |
| 2002/0171917 A1 | 11/2002 | Lelic et al. |
| 2003/0090780 A1 | 5/2003 | Sobe et al. |
| 2011/0292497 A1 | 12/2011 | Bolshtyansky et al. |
| 2012/0327505 A1 | 12/2012 | Fu et al. |
| 2019/0089117 A1 | 3/2019 | Nakamura |

FOREIGN PATENT DOCUMENTS

| | | |
|---|---|---|
| CN | 102307068 A | 1/2012 |
| CN | 107437721 A | 12/2017 |
| CN | 108885382 A | 11/2018 |
| EP | 1054489 A2 | 11/2000 |
| EP | 2639898 A1 | 9/2013 |

OTHER PUBLICATIONS

International Search Report for PCT/CN2018/123701 mailed Jun. 6, 2019; 2 pages.

\* cited by examiner

METHOD, DEVICE AND SYSTEM FOR DYNAMICALLY CONTROLLING GAIN OF RAMAN OPTICAL FIBER AMPLIFIER

CROSS-REFERENCE TO RELATED APPLICATIONS

The present application is a national phase entry under 35 U.S.C § 371 of International Application No. PCT/CN2018/123701 filed Dec. 26, 2018, which claims priority from Chinese Application No. 201811028093.3 filed Sep. 4, 2018, all of which are hereby incorporated herein by reference.

TECHNICAL FIELD OF THE DISCLOSURE

The present disclosure relates to the art of a Raman optical fiber amplifier, in particular to a method, device and system for dynamically controlling a gain of a Raman optical fiber amplifier.

BACKGROUND

With the rapid development of video services, big data, 5G and the Internet of Things, the system demand for the network capacity of the backbone network becomes more and more urgent. 100 Gbit/s systems can no longer fully meet the bandwidth requirements, and systems exceeding 100 Gbit/s, such as 400 Gbit/s systems, are being tested on a small scale, and systems exceeding 100 Gbit/s have higher and higher requirements for the optical signal-to-noise ratio (OSNR). Conventional EDFA amplifiers can no longer meet the requirements of noise figures for a system. However, Distribute Raman Amplifiers (DRA) are used more and more widely in ultra-high-speed, ultra-large capacity and ultra-long distance optical fiber communication systems due to their advantages on extremely low equivalent noise figures. At the same time, in order to support video-on-demand and 5G high-speed download, the conventional electrical crossover rate can no longer fully meet the requirements for huge bandwidth. It is necessary to achieve wavelength-level crossover in the optical layer field. Therefore, a Reconfigurable Optical Add-Drop Multiplexer (ROADM) based on WSS has been commercialized on a large scale, and the increase and decrease of optical channels on the line often occur, causing frequent and dramatic changes in the total optical power on the optical fiber line, which requires the amplifier in the optical fiber line to respond quickly to changes of the input optical signal, to maintain gain stability, and to ensure that no power overshoot or undershoot occurs in the non-switched optical channels in an optical path, in the mean while minimizing an amount of time required to complete the transient process.

The input and the output of distribute Raman optical fiber amplifiers cannot be detected at the same time (the unamplified input power cannot be detected in real time when the pumping is turned on), and it is a challenge to the gain control of distribute Raman optical fiber amplifiers. A Chinese patent application No. 201110174019.4, which is also published as U.S. Pat. No. 8,797,640B2, discloses a method for realizing Raman gain control by using out-of-band spontaneous radiation noise ASE, while the patent application does not mention a dynamic adjustment process for a gain of a distribute Raman optical fiber amplifier and a method for gain control in the transient process.

In view of this, the defects in the current art are problems to be solved urgently.

SUMMARY

The technical problem to be solved by the present disclosure is that in the current art, the increase or decrease of optical channels on the optical path occurs frequently, which will cause the problem of frequent and severe changes in the total optical power on the optical fiber line.

The further technical problem to be solved by the present disclosure is how to realize that the amplifier in the optical fiber line can quickly respond to the change of the input optical signal while still maintaining gain stability.

In embodiments of the present disclosure, the following technical solutions are provided.

In the first aspect, the present disclosure provides a dynamic gain control system for a Raman optical fiber amplifier, comprising the Raman optical fiber amplifier consisting of one or more pump lasers, a central processing unit (CPU) for controlling an operation state of the one or more pump lasers, and an out-of-band ASE detection circuit and an output power detection circuit provided corresponding to the Raman optical fiber amplifier, control circuits of the pump lasers, the out-of-band ASE detection circuit and the output power detection circuit being respectively connected to the central processing unit, characterized in that the system is configured to:

make input signal optical power amplified by the Raman optical fiber amplifier at maximum input power when pumping is off, and set output optical power of all the pump lasers to maximum output power to obtain a current gain $G_M$ and a current gain slope $tilt_M$ of the Raman amplifier;

maintain the output optical power of a specified first pump laser at the maximum output power, and adjust the output optical power of pump lasers of other wavelengths to make a gain slope of the amplifier reach a minimum slope, thereby obtaining a corresponding Raman gain $G_{NM}$ and a corresponding gain slope $tilt_{NM}$;

maintain the output optical power of a specified second pump laser at the maximum output power, and adjust the output optical power of pump lasers of other wavelengths to make the gain slope of the amplifier reach a maximum slope, thereby obtaining a corresponding Raman gain $G_{PM}$ and gain slope $tilt_{PM}$;

by using the gain slope as a first dimension parameter and the gain as a second dimension parameter, fit $(tilt_{NM}, G_{NM})$ and $(tilt_M, G_M)$ to obtain $K_N$ as K and $B_N$ as B in a gain calculation formula in a case of $tilt \leq tilt_M$, and fit $(tilt_M, G_M)$ and $(tilt_{PM}, G_{PM})$ to obtain $K_P$ as K and $B_P$ as B in the gain calculation formula in a case of $tilt \geq tilt_M$, wherein the gain calculation formula is $G = K*Tilt + B$;

calculate maximum gains G corresponding to all the tilts of the Raman optical fiber amplifier, and form a GAIN MASK model by using the calculated maximum gains G.

Preferably, maintaining the output optical power of the specified first pump laser at the maximum output power further comprises:

the central processing unit obtaining an output power value via the output power detection circuit;

the central processing unit acquiring out-of-band ASE power via the out-of-band ASE detection circuit and calculating a current gain of the Raman amplifier according to a linear relationship between the out-of-band ASE power and the gain by the central processing unit; and the central processing unit calculating in-band ASE power according to the current output power value, the current out-of-band ASE power and the current Raman gain to obtain input signal power, and determining that the input signal power reaches a maximum value.

Preferably, among the first pump laser and the second pump laser:

for a Raman optical fiber amplifier with dual pump wavelengths, when a negative slope is adjusted, the first pump laser is a short-wavelength pump; and when a positive slope is adjusted, the second pump laser is a long-wavelength pump.

Preferably, the system is further configured so that:

the central processing unit determines whether a target gain is within a GAIN MASK range;

if the target gain falls within the GAIN MASK range, the central processing unit directly locks the Raman optical fiber amplifier to the target gain by using an out-of-band ASE value obtained via the out-of-band ASE detection circuit;

if the target gain is outside the GAIN MASK range, the central processing unit locks the gain of the Raman optical fiber amplifier to a maximum value of a corresponding GAIN MASK gain, and then gradually increases the locked gain by a predetermined first step length until the locked gain reaches target gain or at least one pump laser reaches its maximum output power.

Preferably, the system is further configured so that:

if the pump output power reaches the maximum output power value, the central processing unit gradually decreases the gain of the amplifier by a predetermined second step length, until an output optical power margin of each pump laser reaches a preset first value, and the gain of the Raman amplifier is locked to the gain that satisfies that the current output optical power margin of each pump laser reaches the preset first value.

In the second aspect, the present disclosure also provides a method for dynamic gain control of a Raman optical fiber amplifier, comprising:

setting output optical power of all pump lasers to maximum output power to obtain a current gain $G_M$ and a current gain slope $tilt_M$ of the Raman amplifier;

maintaining the output optical power of a specified first pump laser at the maximum output power and adjusting the output optical power of pump lasers of other wavelengths to make a gain slope of the amplifier reach a minimum slope, thereby obtaining a corresponding Raman gain $G_{NM}$ and a corresponding gain slope $tilt_{NM}$;

maintaining the output optical power of a specified second pump laser at the maximum output power, and adjusting the output optical power of pump lasers of other wavelengths to make the gain slope of the amplifier reach a maximum slope, thereby obtaining a corresponding Raman gain $G_{PM}$ and a corresponding gain slope $tilt_{PM}$;

by using the gain slope as a first dimension parameter and the gain as a second dimension parameter, fitting $(tilt_{NM}, G_{NM})$ and $(tilt_M, G_M)$ to obtain $K_N$ as K and $B_N$ as B in a gain calculation formula in a case of $tilt < tilt_M$, and fitting $(tilt_M, G_M)$ and $(tilt_{PM}, G_{PM})$ to obtain $K_P$ as K and $B_P$ as B in the gain calculation formula in a case of $tilt \geq tilt_M$, wherein the calculation formula is $G = K*Tilt + B$;

calculating maximum gains G corresponding to all the tilts of the Raman optical fiber amplifier, and forming a GAIN MASK model by using the calculated maximum gains G.

Preferably, maintaining the output optical power of the specified first pump laser at the maximum output power further comprises:

acquiring out-of-band ASE power, and calculating a current gain of the Raman amplifier according to a linear relationship between the out-of-band ASE power and gain;

calculating in-band ASE power according to the current output power value, the current out-of-band ASE power and the current Raman gain to obtain input signal power;

determining that the input signal power reaches a maximum value; maintaining the corresponding specified first pump laser operating at the maximum output power, and adjusting the output optical power of pump lasers of other wavelengths to make the gain slope reaches the minimum slope $tilt_{NM}$, thereby completing adjustment of the Raman maximum gain $G_{NM}$ at this gain slope.

Preferably, among the first pump laser and the second pump laser:

for a Raman optical fiber amplifier with dual pump wavelengths, when a negative slope is adjusted, the first pump laser is a short-wavelength pump; when a positive slope is adjusted, the second pump laser is a long-wavelength pump.

Preferably, the method further comprises, during operation of a distribute Raman optical fiber amplifier:

determining whether a target gain is within a GAIN MASK range;

if the target gain is within the GAIN MASK range, directly locking the gain of the Raman optical fiber amplifier to the target gain;

if the target gain is outside the GAIN MASK range, locking the gain of the Raman optical fiber amplifier to a maximum value of the corresponding GAIN MASK gain, and then gradually increasing the locked gain by a predetermined first step length until the target gain is reached or at least one pump laser reaches its maximum output power.

Preferably, if the pump output power reaches the maximum output power value, the gain of the amplifier is gradually decreased by a predetermined second step length until an output optical power margin of each pump laser reaches a predetermined first value, and the gain of the Raman amplifier is locked to the gain that satisfies the current output optical power margin of each pump laser reaches the predetermined first value.

In the third aspect, the present disclosure also provides a method for dynamically controlling a gain of a Raman optical fiber amplifier, comprising:

determining whether a target gain is within a GAIN MASK range;

if the target gain is within the GAIN MASK range, directly locking the gain of the Raman optical fiber amplifier to the target gain;

if the target gain is outside the GAIN MASK range, locking the gain of the Raman optical fiber amplifier to a maximum value of a corresponding GAIN MASK gain, and then gradually increasing the locked gain by a predetermined first step length until the target gain is reached or at least one pump laser reaches its maximum output power.

In the fourth aspect, the present disclosure also provides a device for dynamically controlling a gain of a Raman optical fiber amplifier, comprising at least one processor; and a memory communicatively connected with the at least one processor; wherein the memory stores instructions executable by the at least one processor, and the instructions are configured in a program to carry out the method for dynamically controlling the gain of the Raman optical fiber amplifier described in the second aspect.

Compared with the prior art, the beneficial effects of the embodiments of the present disclosure are:

in the present disclosure, by using the input power range and the gain slope of the amplifier, the maximum gains GAIN MASK that can be achieved over the entire input optical power range of the Raman optical fiber amplifier are calculated. Thus, it provides a new reference basis for considering both the target gain and the stability of signal control in the specific implementation process.

Further, in the preferred solutions of the present disclosure, it is realized that the amplifier in the optical fiber line can quickly respond to the change of the input optical signal, maintain gain stability, and keep the non-switched optical channel in the optical path from generating excessive power overshoot or undershoot, and on the other hand, make the time for completing the switching as short as possible, when gain switching occurs.

BRIEF DESCRIPTION OF THE DRAWINGS

In order to explain the embodiments of the present disclosure or the technical solutions in the prior art more clearly, drawings that need to be used in the description of the embodiments or the prior art will be briefly introduced hereinafter. Obviously, the drawings in the following description are only some embodiments of the present disclosure. For those of ordinary skill in the art, other drawings can be obtained based on these drawings without creative efforts.

DETAILED DESCRIPTION

In order to make the objectives, technical solutions and advantages of the present disclosure clearer, the present disclosure is further described hereinafter in detail with reference to the accompanying drawings and embodiments. It should be understood that the specific embodiments described herein are only used to explain the present disclosure, but not to limit the present disclosure.

In addition, the technical features involved in the various embodiments of the present disclosure described below can be combined with each other as long as they do not conflict with each other.

A non-switched optical channel is also called a remaining channel, and will be collectively referred to as the remaining channel hereinafter. In the time and wavelength division multiplexing (TWDM) technology, different optical channels refer to different timings and/or frequency bands occupied during optical signal transmission.

A target gain range of a Raman amplifier mentioned here comprises two parts: a gain MASK (GAIN MASK) interval and an extended interval (that is, the area between the GAIN MASK and an actual maximum gain). The GAIN MASK Interval is a Raman gain range calibrated or calculated based on a relationship of the hardware and a gain slope of a Raman amplifier, namely a gain range that an input optical power can reach over the entire input power range under a set gain slope. The extended gain interval is a gain range whose gain is beyond the GAIN MASK. In the extended interval, under different input power, the maximum gain that a Raman amplifier module can reach will be different. In a case of the input power is lower, the Raman gain can reach a larger gain value, possibly reaching the target gain of the Raman amplifier module. In contrast, in a case of the input power is higher, the gain value can be reached by the Raman amplifier may be somehow less, and the Raman amplifier may be unable to reach the target gain.

Embodiment 1

Figure 1:
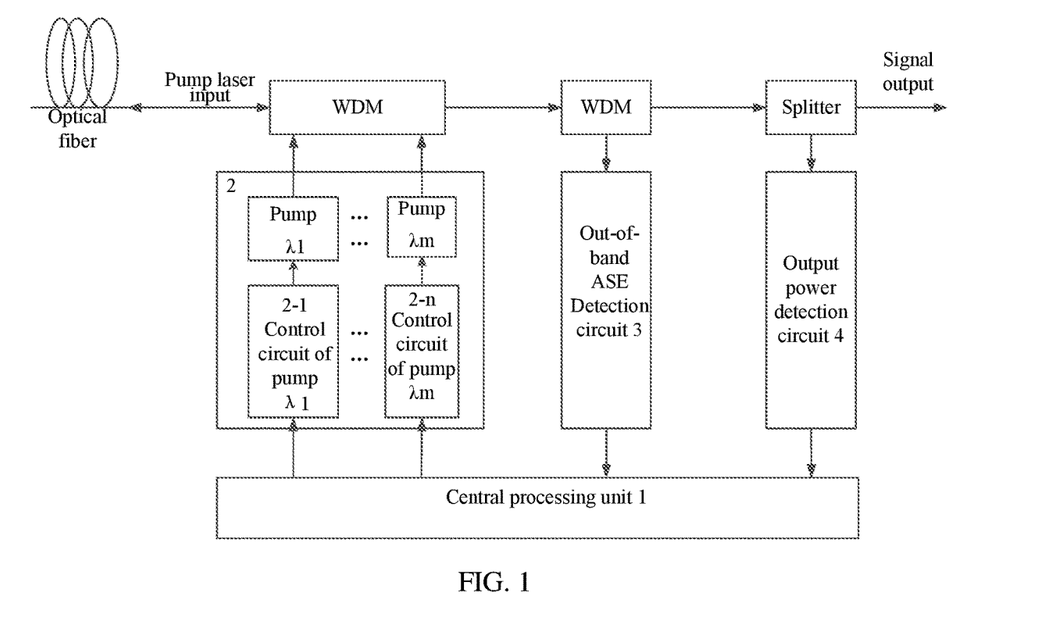
FIG. 1 is a schematic structural diagram of a system for dynamically controlling a gain of a Raman optical fiber amplifier according to an embodiment of the present disclosure.

In the Embodiment 1 of the present disclosure, there is provided a system for dynamically controlling a gain of a Raman optical fiber amplifier (or referred to as a gain dynamic control system for a Raman optical fiber amplifier). As shown in FIG. 1, the system comprises a Raman optical fiber amplifier 2 consisting of one or more pump lasers ($\lambda 1, \ldots, \lambda 2$) and control circuits (2-1, . . . , 2-n) for controlling an operation state of the one or more pump lasers, an out-of-band ASE detection circuit 3 and an output power detection circuit 4 provided corresponding to the Raman optical fiber amplifier 2. The control circuits (2-1, . . . , 2-n) of the pump lasers, the out-of-band ASE detection circuit 3 and the output power detection circuit 4 are respectively connected to a central processing unit 1. The system is configured to:

make optical power of an input signal amplified by the Raman optical fiber amplifier at maximum input power when pumping is off, and set, by the central processing unit 1, output optical power of all the pump lasers to maximum output power to obtain a current gain $G_M$ and a current gain slope $\text{tilt}_M$ of the Raman amplifier;

maintain the output optical power of a specified first pump laser at the maximum output power and adjust the output optical power of pump lasers of other wavelengths to make a gain slope of the amplifier to reach a minimum slope, thereby obtaining a corresponding Raman gain $G_{NM}$ and a corresponding gain slope $\text{tilt}_{NM}$;

maintain the output optical power of a specified second pump laser at the maximum output power and adjust the output optical power of pump lasers of other wavelengths to make the gain slope of the amplifier reach a maximum slope, thereby obtaining a corresponding Raman gain $G_{PM}$ and a corresponding gain slope $\text{tilt}_{PM}$;

by using the gain slope as a first dimension parameter and the gain as a second dimension parameter, fit ($\text{tilt}_{NM}$, $G_{NM}$) and (tilt$_M$, $G_M$) to obtain $K_N$ as K and $B_N$ as B in a gain calculation formula in a case of tilt<tiltM, and fit (tilt$_M$, $G_M$) and (tilt$_{PM}$, $G_{PM}$) to obtain $K_P$ as K and $B_P$ as B in the gain calculation formula in a case of tilt≥tilt$_M$, wherein the gain calculation formula is G=K*Tilt+B;

calculate maximum gains G corresponding to all the tilts of the Raman optical fiber amplifier 22, and form a GAIN MASK model by using the calculated maximum gain G.

In the embodiment of the present disclosure, by means of the input power range and the gain slope of the amplifier, the maximum gains GAIN MASK of the Raman optical fiber amplifier which could be achieved over the entire input optical power range are calculated. Thus, it provides a new reference basis for considering both the target gain and the stability of signal control in the specific implementation process.

In an embodiment of the present disclosure, maintaining the output optical power of the specified first pump laser at the maximum output power actually comprises two meanings: 1. the signal optical power being input reaches the maximum value; 2. the gain of the Raman optical fiber amplifier is also at the maximum value; at this time, the condition that the output optical power of the first pump laser in the embodiment of the present disclosure is at the maximum output power can be satisfied. Therefore, in combination with the system described in the embodiment 1 of the present disclosure, there is also provided the process for realizing the above condition in the system, specifically comprising:

the central processing unit 1 obtains an output power value via the output power detection circuit 4. The output power value is the optical power value of an output signal detected by the optical splitter, as shown at the right side of FIG. 1.

the central processing unit 1 acquires out-of-band ASE power via the out-of-band ASE detection circuit 3, and calculates a current gain of the Raman amplifier according to a linear relationship between the out-of-band ASE power and the gain; and the central processing unit 1 calculates in-band ASE power according to the current output power value, the current out-of-band ASE power and the current Raman gain to obtain input signal power, wherein the output signal optical power value can be calculated by means of a formula (output power value–out-of-band ASE power–in-band ASE), and the input signal power can be obtained further according to the output signal optical power value/Raman gain.

it is determined that the input signal power reaches a maximum value; and it is obtained that the output optical power of the correspondingly specified first pump laser is at the maximum output power by maintaining the specified first pump laser operating at the maximum gain.

In the implementation process of the embodiment of the present disclosure, for the selection of the first pump laser and the second pump laser, limitation is also necessary. Specifically, for a Raman optical fiber amplifier with dual pump wavelengths, when a negative slope is adjusted, the first pump laser is a short-wavelength pump; and when a positive slope is adjusted, the second pump laser is a long-wavelength pump. For a Raman optical fiber amplifier with more than 2 pump wavelengths, the pump wavelengths are divided into two groups, one group of which are short-wavelength pump lasers, and the other group of which are long-wavelength pump lasers. There is a fixed proportional relationship among the pump power of each wavelength in each group and it remains unchanged. When a negative slop is adjusted, the pump power of the short-wavelength group is maintained at the maximum output power (because the pump power of the pump laser in each group is adjusted in a fixed ratio, if the pump power of one wavelength in the group reaches the maximum, then the pump output power of the other pump lasers in the group is maintained unchanged). When a positive slope is adjusted, the pump power of the long-wavelength group is maintained at the maximum output power (because the pump power of the pump laser in each group is adjusted in the fixed ratio, if the pump power of one wavelength in the group reaches the maximum, the pump output power of the other pump lasers in the group is maintained unchanged).

In the Embodiment 1 of the present disclosure, there is provided a maximum gain of GAIN MASK which could be achieved by various input signals applicable to the current Raman optical fiber amplifier. Therefore, there is also provided a preferred implementation solution for the system proposed by the present disclosure, specifically:

the central processing unit 1 determines whether a target gain is within a GAIN MASK range;

if the target gain is within the GAIN MASK range, the central processing unit 1 directly locks the gain of the Raman optical fiber amplifier 2 to the target gain by using an out-of-band ASE value obtained via the out-of-band ASE detection circuit 3;

if the target gain is outside the GAIN MASK range, the central processing unit 1 locks the gain of the Raman optical fiber amplifier 2 to a maximum value of the corresponding GAIN MASK gain, and then gradually increases the locked gain by a predetermined first step length, until the target gain is reached or at least one pump laser reaches its maximum output power.

In the above-mentioned preferred solution of the embodiment of the present disclosure, it is realized that the amplifier in the optical fiber line can quickly respond to the change of the input optical signal, maintain gain stability, and keep the non-switched optical channel in the optical path from generating excessive power overshoot or undershoot, on the other hand, when gain switching occurs, make the time for completing switching as short as possible. That is, based on the GAIN MASK reference basis, the above jump to the target gain can be realized, without the need for step-by-step adjustment at first as in the prior art.

In combination with an embodiment of the present disclosure, there is a preferred implementation solution during the implementation of the system, especially for the situation where the above-mentioned target gain is greater than the GAIN MASK and is close to or greater than the maximum gain that can be achieved by the Raman optical fiber amplifier. In this preferred implementation solution, the system is further configured so that:

if the pump output power reaches the maximum output power value, the central processing unit 1 gradually decreases the gain of the amplifier by a predetermined second step length until an output optical power margin of each pump laser reaches a predetermined first value, and the gain of the Raman amplifier is locked to a gain at which the current output optical power margin of each pump laser reaches the preset first value.

Embodiment 2

Figure 2:
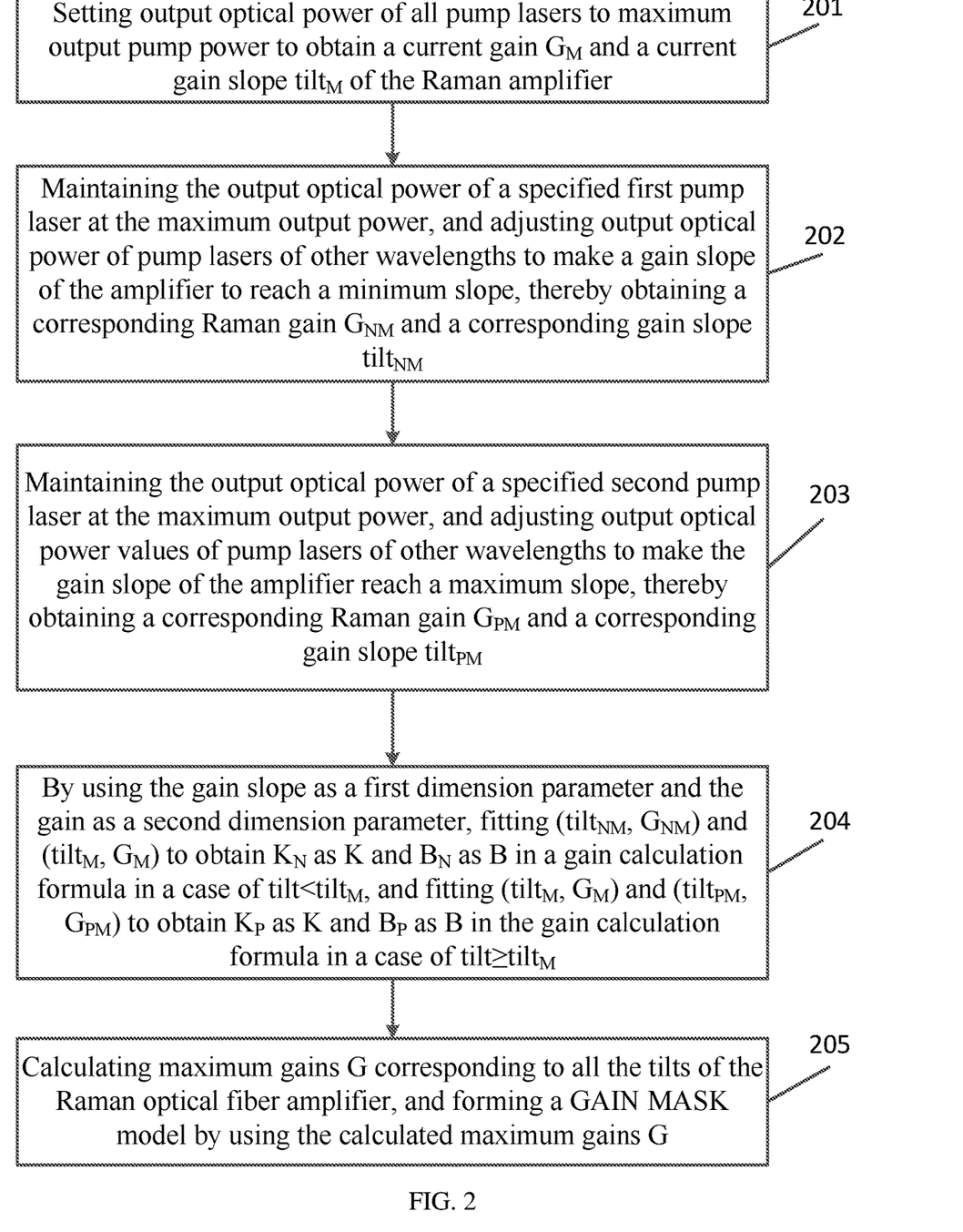
FIG. 2 is a schematic flowchart of a method for dynamically controlling a gain of a Raman optical fiber amplifier according to an embodiment of the present disclosure.

After the embodiment of the present disclosure provides the gain dynamic control system of the Raman optical fiber amplifier as described in embodiment 1, an embodiment of the present disclosure also provide a corresponding method for dynamically controlling a gain of a Raman optical fiber amplifier, which can be implemented in the system in Embodiment 1, and can also be applied to other systems similar to the system architecture described in Embodiment 1, which are not specifically limited here. As shown in FIG. 2, the method comprises:

in step 201, setting output optical power of all pump lasers to maximum output pump power to obtain a current gain $G_M$ and a current gain slope $tilt_M$ of the Raman amplifier.

The step 201 is usually implemented under the following constraints: the system is configured such that optical power of an input signal amplified by the Raman amplifier is at maximum input power when pumping is off.

In step 202, maintaining the output optical power of a specified first pump laser at the maximum output power, and adjusting the output optical power of pump lasers of other wavelengths to make a gain slope of the amplifier to reach a minimum slope, thereby obtaining a corresponding Raman gain $G_{NM}$ and a corresponding gain slope $tilt_{NM}$.

In step 203, maintaining the output optical power of a specified second pump laser at the maximum output power, and adjusting the output optical power of pump lasers of other wavelengths to make the gain slope of the amplifier reach a maximum slope, thereby obtaining a corresponding Raman gain $G_{PM}$ and a corresponding gain slope $tilt_{PM}$.

In step 204, by using the gain slope as a first dimension parameter and the gain as a second dimension parameter, fitting ($tilt_{NM}$, $G_{NM}$) and ($tilt_M$, $G_M$) to obtain $K_N$ as K and $B_N$ as B in a gain calculation formula in a case of $tilt<tilt_M$, and fitting ($tilt_M$, $G_M$) and ($tilt_{PM}$, $G_{PM}$) to obtain $K_P$ as K and $B_P$ as B in the gain calculation formula in a case of $tilt \geq tilt_M$, wherein the gain calculation formula is G=K*Tilt+B (1).

In step 205, calculating maximum gains G corresponding to all the tilts of the Raman optical fiber amplifier, and forming a GAIN MASK model by using the calculated maximum gains G.

In the embodiment of the present disclosure, according to the input power range and the gain slope of the amplifier, the GAIN MASKs, being the maximum gains of the Raman optical fiber amplifier which could be achieved over the entire input optical power range, are calculated. Thus, it provides a new reference basis for considering both the target gain and the stability of signal control in the specific implementation process.

In an embodiment of the present disclosure, the fitting in the above step 204 can be specifically implemented by the following method. In the coordinates, linear fitting is performed by connecting two points ($tilt_M$, $G_M$) and ($tilt_{NM}$, $G_{NM}$) to obtain the values of K and B in the gain calculation formula which are denoted as: $K_N$, $B_N$ in a case of $tilt<tilt_M$. In the coordinates, by connecting two points ($tilt_M$, $G_M$) and ($tilt_{PM}$, $G_{PM}$), linear fitting is performed to obtain the values of K and B in the gain calculation formula in a case of $tilt \geq tilt_M$, which is denoted as: $K_P$, $B_P$. By means of calibration parameters $K_N$, $B_N$, $K_P$, $B_P$, the maximum gains G corresponding to all the tilts are calculated by using the above mentioned formula (1), which are the maximum gain values of the GAIN MASK model.

Figure 3:
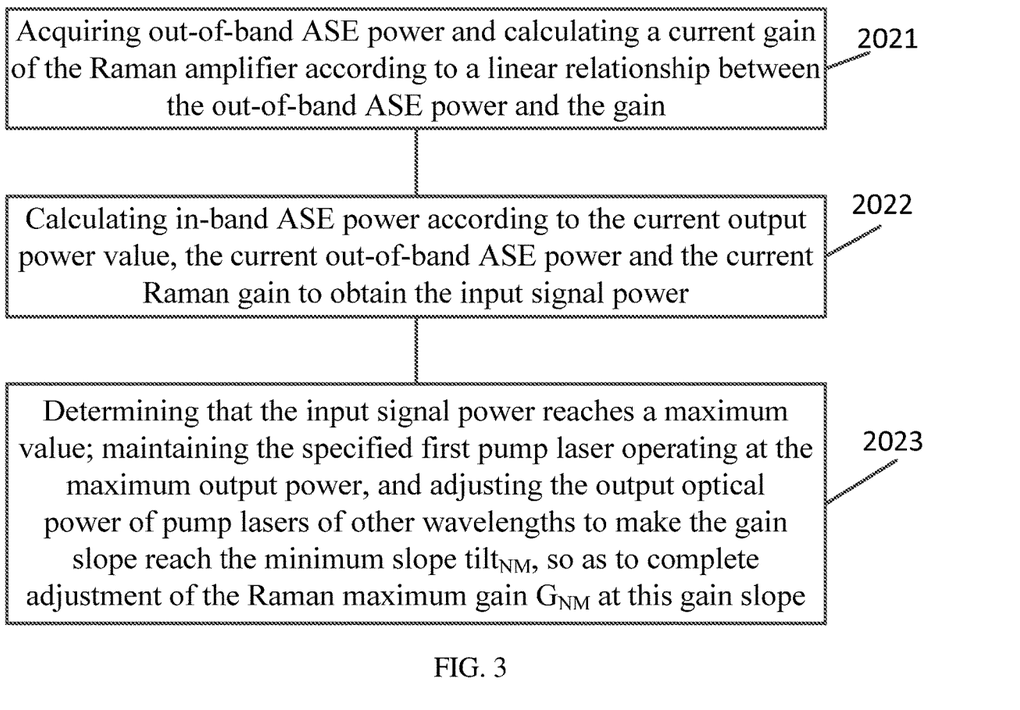
FIG. 3 is a schematic flowchart for calculating a maximum output power in a method for dynamically controlling a gain of a Raman optical fiber amplifier according to an embodiment of the present disclosure.

With reference to an embodiment of the present disclosure, a specific implementation method is also provided for what is involved in step 202, and as shown in FIG. 3, it specifically comprises:

in step 2021, acquiring out-of-band ASE power, and calculating a current gain of the Raman amplifier according to a linear relationship between the out-of-band ASE power and the gain.

In step 2022, calculating in-band ASE power according to the current output power value, the current out-of-band ASE power and the current Raman gain to obtain the input signal power.

In step 2023, determining that the input signal power reaches a maximum value; maintaining the specified first pump laser operating at the maximum output power, and adjusting the output optical power of pump lasers of other wavelengths to make the gain slope reach the minimum slope $tilt_{NM}$, so as to complete adjustment of the Raman maximum gain $G_{NM}$ at this gain slope.

The maximum value of the output optical power of the first wavelength obtained through the above steps 2021-2023 is the most real maximum value in a strict sense. It comprehensively considers two major factors affecting the output optical power, and has carried out rigorous calculations through steps 2021-2023 proposed by the present disclosure, further given the reference and guarantee of the set values (comprising the input optical power and the gain of the Raman optical fiber amplifier).

The maximum output power of the pump laser is determined by the laser itself. In the embodiments of the present disclosure, what needs to be determined is the Raman gain obtained when the high pump output power is at the maximum. Calculating the input signal optical power based on the output power and the gain is to determine whether the input optical power exceeds the maximum input optical power. Because the GAIN MASK proposed in the embodiments of the present disclosure is determined under the condition of maximum input optical power, if the input signal optical power is greater than the specified maximum optical power, the originally calibrated GAIN MASK is no longer applicable.

In the implementation process of the embodiment of the present disclosure, as for the selection of the first pump laser and the second pump laser, limitation is necessary even if in the optimal implementation solution. Specifically, for a Raman optical fiber amplifier with dual pump wavelengths, when a negative slope is adjusted, the first pump laser is a short-wavelength pump; when a positive slope is adjusted, the second pump laser is a long-wavelength pump. For a Raman optical fiber amplifier with more than 2 pump wavelengths, the pump wavelengths are divided into two groups: one group of which are short-wavelength pump lasers, and the other group of which are long-wavelength pump lasers. There is a fixed proportional relationship between the pump power of each wavelength in each group and it remains unchanged. When the adjusting slope is negative, the pump power of the short-wavelength group is maintained at the maximum output power (because the pump power of the pump laser in each group is adjusted in a fixed ratio, if the pump power of one wavelength in the group reaches the maximum, the pump output power of the other pump lasers in the group will be kept unchanged). When the adjusting slope is positive, the pump power of the long-wavelength group is maintain at the maximum output power (because the pump power of the pump laser in each group is adjusted in the fixed ratio, if the pump power of one wavelength in the group reaches the maximum, the pump output power of the other pump lasers in the group will be kept unchanged).

Figure 4:
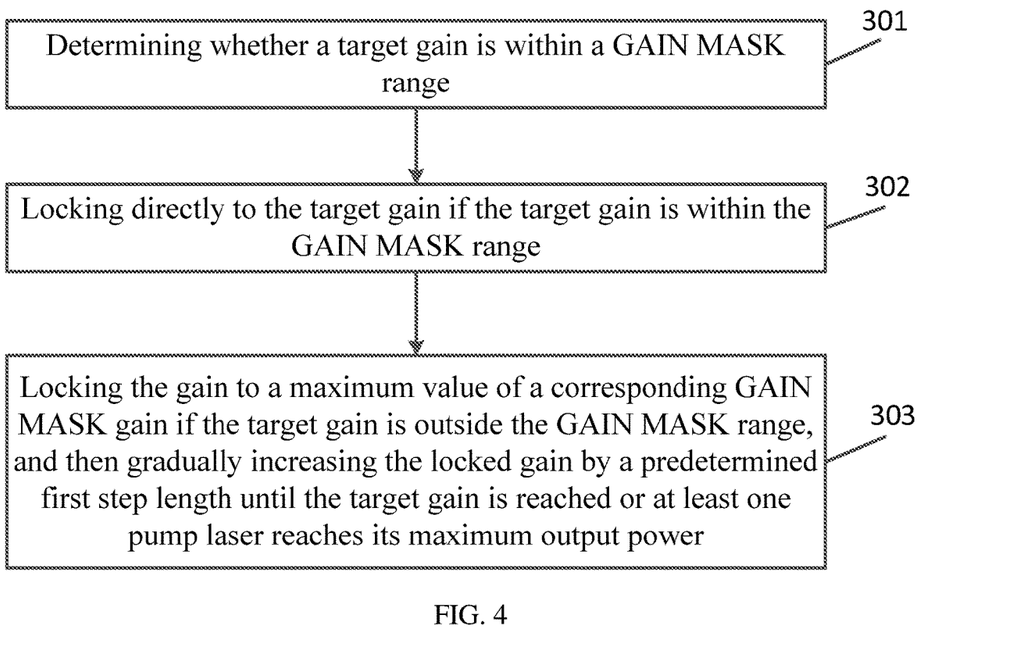
FIG. 4 is a flowchart for a method for adjusting to a target gain in a method for dynamically controlling a gain of a Raman optical fiber amplifier according to an embodiment of the present disclosure.

In the Embodiment 2 of the present disclosure, there is provided a maximum gain GAIN MASK which could be achieved by various input signals applicable to the current Raman optical fiber amplifier. Therefore, a preferred implementation solution for quick response is also provided in the specific control process for the system proposed by the present disclosure. As shown in FIG. 4, the method further comprises:

In step 301, determining whether a target gain is within a GAIN MASK range.

In step 302, locking directly to the target gain if the target gain is within the GAIN MASK range.

In step 303, locking the gain to a maximum value of the corresponding GAIN MASK gain if the target gain is outside the GAIN MASK range, and then gradually increasing the locked gain by a predetermined first step length until the target gain is reached or at least one pump laser reaches its maximum output power.

Preferably, in order to make a distribute Raman optical fiber amplifier to meet the scenarios where some bursts of light may occur, preferably after step 303, the following step 304 can be used for security adjustment:

if the pump output power reaches the maximum output power value, the gain of the amplifier is gradually decreased by a predetermined second step length until an output optical power margin of each pump laser reaches a predetermined first value, and the gain of the Raman amplifier is locked to the gain at which the current output optical power margin of each pump laser reaches the preset first value.

Embodiment 3

Figure 5:
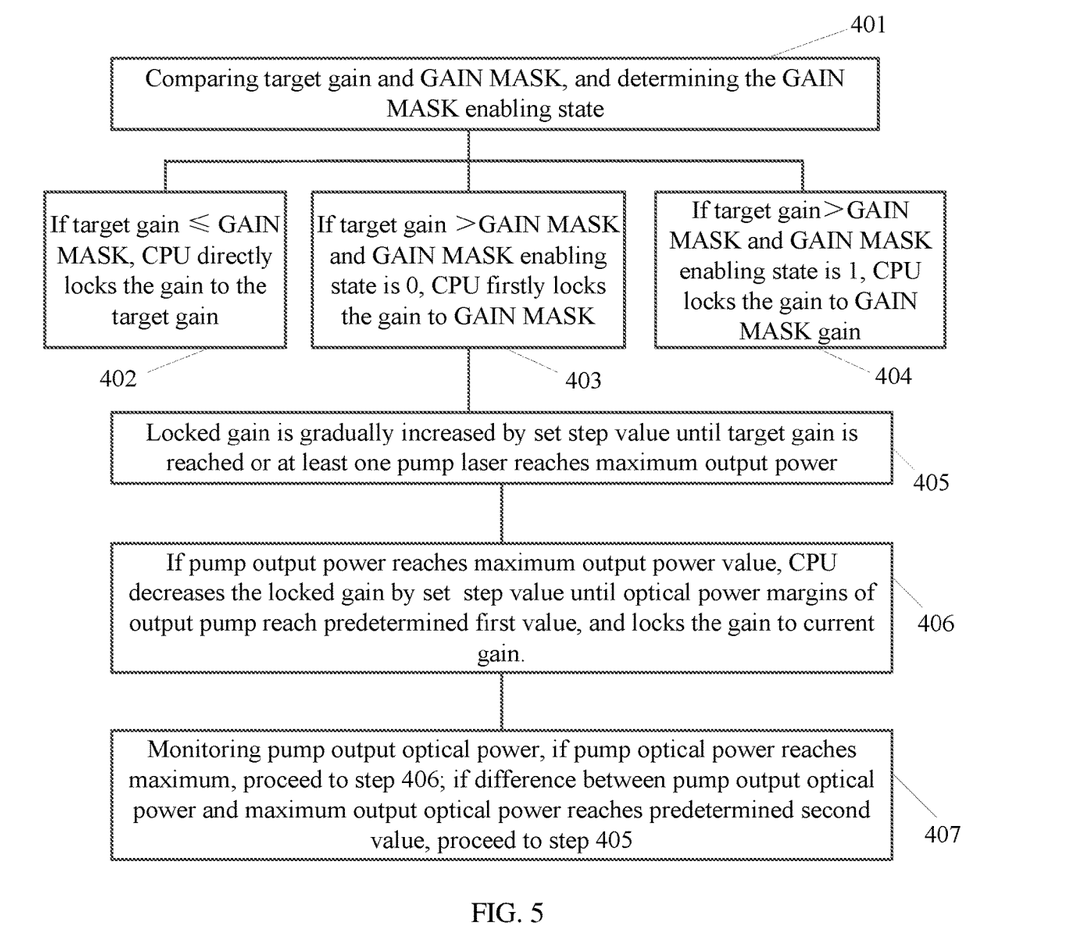
FIG. 5 is a schematic flowchart for another method for dynamically controlling a gain of a Raman optical fiber amplifier according to an embodiment of the present disclosure.

In an embodiment of the present disclosure, there is also provided an implementation solution for applying the GAIN MASK proposed in the Embodiment 2 of the present disclosure in a specific application scenario. The specific application scenario refers to the function that the GAIN MASK is set as an optional configuration, and the method needs to determine the enabling state of the GAIN MASK in the specific implementation process, so as to complete the entire implementation process. Specifically, it will be described in conjunction with the system shown in Embodiment 1, and as shown in FIG. 5, it comprises:

In step 401, the central processing unit 1 determines the GAIN MASK enabling state of the Raman amplifier, and determines whether the target gain is limited within the gain range of the GAIN MASK according to the state of the GAIN MASK.

When the GAIN MASK enabling state is in the enabled state, if the target gain is not greater than the GAIN MASK, step 402 is executed, and the central processing unit 1 directly locks the Raman gain to the target gain, and ends the current round of adjustment process. If the target gain is greater than GAIN MASK, proceed to step 404, the locked gain of the Raman amplifier will be limited within the GAIN MASK range, and the target gain set that exceeds the GAIN MASK will be forced to be locked to the maximum gain that satisfies the GAIN MASK, and ends the current round of adjustment process.

When the GAIN MASK enabling state is disabled, proceed to step 403, in which the locked gain of the Raman amplifier can be set to a gain closest to the target gain. The specific method comprises: determining whether the target gain is within the GAIN MASK range; directly locking the actual locked gain of the Raman amplifier to the target gain by the central processing unit if the target gain is within the GAIN MASK range; and if the target gain is outside the GAIN MASK range, firstly locking the actual locked gain of the Raman amplifier to the maximum value of the corresponding GAIN MASK gain by the central processing unit, and then proceeding to step 405.

In step 405, the actual locked gain of the Raman amplifier is gradually increased by a set step value until the target gain is reached or at least one pump laser reaches the maximum output power.

In step 406, if the pump output power reaches the maximum output power value, the actual locked gain of the Raman amplifier is gradually decreased by a step predetermined by the Raman amplifier module until an output optical power margin of each pump laser reaches a predetermined first value. At this time, the central processing unit locks the target locked gain of the Raman amplifier to the current gain.

In step 407, the current gain and the target gain are continuously compared, and the pump laser is monitored in real time. If at least one pump laser reaches the maximum output power, skip back to step 406 and gradually decrease the locked gain of the amplifier by the preset step until the output optical power margin of each pump laser reaches the preset first value. At this time, the central processing unit locks the target locked gain of the Raman amplifier to the current gain.

In step 407, the current gain is continuously compared with the target gain, and when the locked gain is less than the target gain, and the difference between the output optical power of the pump and the stored maximum output optical power is greater than a predetermined second value, the gain adjustment is started: increasing, step by step, the locked gain of the amplifier by the set step until the locked gain of the amplifier reaches the target gain, or the pump output power reaches the maximum output power value. If the pump output power reaches the maximum output power value, the locked gain of the amplifier is gradually decreased by the set step until the output optical power margin of each pump laser reaches the predetermined first value. At this time, the central processing unit locks the gain of the Raman amplifier to the current gain.

In the embodiment of the present disclosure, the Raman amplifier comprises the GAIN MASK and has the GAIN MASK enabling function. When the GAIN MASK is enabled, the gain of the Raman amplifier can be limited within the GAIN MASK range. No matter how the optical fiber line is switched, the Raman amplifier can satisfy the gain lock without gain change, enabling the locked gain of remaining channels to remain unchanged, such that the overshoot and undershoot amplitude caused by channel switching is minimized to ensure the communication line error code performance.

On the other hand, when the GAIN MASK enabling is in the disabled state, the Raman amplifier can maximize its actual locked gain as close to the target gain as possible. At this time, the Raman amplifier can make full use of the pump output optical power of the Raman amplifier, thereby boosting the actual gain of the amplifier and improving the noise figure of the line to the great extent, which is conducive to improving the error performance of the optical fiber line in the steady state. When channel switching causing the signal optical power to change occurs in the optical fiber line, the Raman amplifier performs gain switching in a stepwise increasing or decreasing manner, effectively avoiding sudden changes in the gain of the remaining optical channels and optical power overshoot and undershoot.

Embodiment 4

Figure 6:
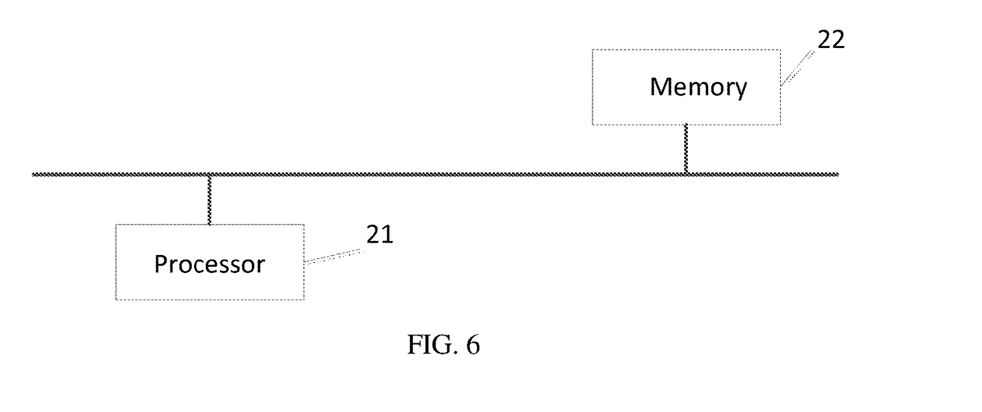
FIG. 6 is a schematic structural diagram for a device for dynamically controlling a gain of a Raman optical fiber amplifier according to an embodiment of the present disclosure.

In an embodiment of the present disclosure, there is further provided a device for dynamically controlling a gain of a Raman optical fiber amplifier. As shown in FIG. 6, the device comprises at least one processor 21, and a memory 22 communicatively connected with the at least one processor 21.

The processor 21 and the memory 22 may be connected by a bus or in other ways. In FIG. 6, the connection by a bus is taken as an example.

As a non-volatile computer-readable storage medium, the memory 22 can be used to store non-volatile software programs and non-volatile computer-executable programs, such as the gain dynamic control method for the Raman optical fiber amplifier in Embodiment 2. The processor 21 executes the gain dynamic control method for the Raman optical fiber amplifier by running the non-volatile software program and instructions stored in the memory 22.

The memory 22 may comprise a high-speed random access memory, and may also comprise a non-volatile memory, such as at least one magnetic disk storage device, a flash memory device, or other non-volatile solid-state storage devices. In some embodiments, the memory 22 may optionally comprise memories remotely provided with respect to the processor 21, and these remote memories may be connected to the processor 21 through networks. Examples of the aforementioned networks comprise, but are not limited to, the Internet, corporate intranets, local area networks, mobile communication networks, and combinations thereof.

The program instructions/modules are stored in the memory 22, and when executed by the one or more processors 21, carry out the gain dynamical control method for the Raman optical fiber amplifier in the above Embodiment 1, for example, the various steps shown in FIG. 2-5 of the above description.

It is worth noting that the information interaction and execution process between the units in the above-mentioned device are based on the same concept as the Embodiment 2 and the Embodiment 3 of the processing method of the present disclosure and thus as for details thereof, please refer to the method embodiment of the present disclosure, which is not repeated here.

It is obvious for a person of ordinary skill in the art that all or part of the steps in the various methods of the embodiments of the present application can be completed by a program instructing relevant hardware. The program can be stored in a computer-readable storage medium comprising: Read Only memory (ROM), random access memory (RAM), magnetic disk or optical disk, etc.

The above descriptions are only the preferred embodiments of the present disclosure and are not intended to limit the present disclosure. Any modification, equivalent replacement and improvement made within the spirit and principle of the present disclosure shall be comprised in the protection scope of the present disclosure.

What is claimed is:

1. A system for dynamically controlling a gain of a Raman optical fiber amplifier, comprising the Raman optical fiber amplifier consisting of one or more pump lasers, a central processing unit for controlling an operation state of the one or more pump lasers, and an out-of-band ASE detection circuit and an output power detection circuit provided corresponding to the Raman optical fiber amplifier, control circuits of the pump lasers, the out-of-band ASE detection circuit and the output power detection circuit being respectively connected to the central processing unit, characterized in that the system is configured to:

make input signal optical power amplified by the Raman optical fiber amplifier at maximum input power when pumping is off and set, by the central processing unit, output optical power of all the pump lasers to maximum output power, so as to obtain a current gain $G_M$ and a current gain slope $tilt_M$ of the Raman amplifier;

maintain the output optical power of a specified first pump laser at the maximum output power and adjust the output optical power of pump lasers of other wavelengths to make a gain slope of the amplifier reach a minimum slope, thereby obtaining a corresponding Raman gain $G_{NM}$ and a corresponding gain slope $tilt_{NM}$;

maintain the output optical power of a specified second pump laser at the maximum output power and adjust the output optical power of pump lasers of other wavelengths to make the gain slope of the amplifier reach a maximum slope, thereby obtaining a corresponding Raman gain $G_{PM}$ and a corresponding gain slope $tilt_{PM}$;

by using the gain slope as a first dimension parameter and the gain as a second dimension parameter, fit $(tilt_{NM}, G_{NM})$ and $(tilt_M, G_M)$ to obtain $K_N$ as K and $B_N$ as B in a gain calculation formula in a case of tilt $<tilt_M$, and fit $(tilt_M, G_M)$ and $(tilt_{PM}, G_{PM})$ to obtain Kp as K and Bp as B in the gain calculation formula in a case of tilt≥$tilt_M$, wherein the gain calculation formula is G=K*Tilt+B;

calculate maximum gains G corresponding to all the tilts of the Raman optical fiber amplifier, and form a GAIN MASK model by using the calculated maximum gains G.

2. The system for dynamically controlling a gain of a Raman optical fiber amplifier of claim 1, characterized in that maintaining the output optical power of the specified first pump laser at the maximum output power further comprises:

the central processing unit obtaining an output power value via the output power detection circuit;

the central processing unit acquiring out-of-band ASE power via the out-of-band ASE detection circuit, and calculating a current gain of the Raman amplifier according to a linear relationship between the out-of-band ASE power and the gain; and the central processing unit calculating in-band ASE power according to the current output power value, the current out-of-band ASE power and the current Raman gain to obtain input signal power, and determining that the input signal power reaches a maximum value.

3. The system for dynamically controlling a gain of a Raman optical fiber amplifier of claim 2, characterized in that among the first pump laser and the second pump laser:

for a Raman optical fiber amplifier with dual pump wavelengths, when a negative slope is adjusted, the first pump laser is a short-wavelength pump; and when a positive slope is adjusted, the second pump laser is a long-wavelength pump.

4. The system for dynamically controlling a gain of a Raman optical fiber amplifier of claim 1, characterized in that the system is further configured so that:

the central processing unit determines whether a target gain falls within a GAIN MASK range;

if the target gain falls within the GAIN MASK range, the central processing unit directly locks the Raman optical fiber amplifier to the target gain by using an out-of-band ASE value obtained via the out-of-band ASE detection circuit;

if the target gain is outside the GAIN MASK range, the central processing unit locks the gain of the Raman optical fiber amplifier to a maximum value of a corresponding GAIN MASK gain, and then gradually increases the locked gain by a predetermined first step length until the locked gain reaches the target gain or at least one pump laser reaches its maximum output power.

5. A method for dynamically controlling a gain of a Raman optical fiber amplifier, characterized in comprising:
setting output optical power of all pump lasers to maximum output pump power to obtain a current gain $G_M$ and a current gain slope $tilt_M$ of the Raman amplifier;
maintaining the output optical power of a specified first pump laser at the maximum output power and adjusting the output optical power of pump lasers of other wavelengths to make a gain slope of the amplifier reach a minimum slope, thereby obtaining a corresponding Raman gain $G_{NM}$ and a corresponding gain slope $tilt_{NM}$;
maintaining the output optical power of a specified second pump laser at the maximum output power and adjusting the output optical power of pump lasers of other wavelengths to make the gain slope of the amplifier reach a maximum slope, thereby obtaining a corresponding Raman gain $G_{PM}$ and a corresponding gain slope $tilt_{PM}$;
by using the gain slope as a first dimension parameter and the gain as a second dimension parameter, fitting ($tilt_{NM}$, $G_{NM}$) and ($tilt_M$, $G_M$) to obtain $K_N$ as K and $B_N$ as B in a gain calculation formula in a case of tilt <$tilt_M$, and fitting ($tilt_M$, $G_M$) and ($tilt_{PM}$, $G_{PM}$) to obtain Kp as K and Bp as B in the gain calculation formula in a case of tilt≥$tilt_M$, wherein the calculation formula is G=K*Tilt+B;
calculating maximum gains G corresponding to all the tilts of the Raman optical fiber amplifier, and forming a GAIN MASK model by using the calculated maximum gains G.

6. The method for dynamically controlling a gain of a Raman optical fiber amplifier of claim 5, characterized in that maintaining the output optical power of the specified first pump laser at the maximum output power and adjusting the output optical power of pump lasers of other wavelengths to make the gain slope of the amplifier reach the minimum slope, thereby obtaining the corresponding Raman gain $G_{NM}$ and the corresponding gain slope $tilt_{NM}$ further comprises:
acquiring out-of-band ASE power, and calculating a current gain of the Raman amplifier according to a linear relationship between the out-of-band ASE power and the gain;
calculating in-band ASE power according to the current output power value, the current out-of-band ASE power and the current Raman gain to obtain input signal power;
determining that the input signal power reaches a maximum value; maintaining the corresponding specified first pump laser operating at the maximum output power, and adjusting the output optical power values of pump lasers of other wavelengths to make the gain slope reach the minimum slope $tilt_{NM}$, thereby completing adjustment of the Raman maximum gain $G_{NM}$ at this gain slope.

7. The method for dynamically controlling a gain of a Raman optical fiber amplifier of claim 6, characterized in that among the first pump laser and the second pump laser:
for a Raman optical fiber amplifier with dual pump wavelengths, when a negative slope is adjusted, the first pump laser is a short-wavelength pump; when a positive slope is adjusted, the second pump laser is a long-wavelength pump.

8. The method for dynamically controlling a gain of a Raman optical fiber amplifier of claim 6, characterized in that the method further comprises, during operation of a distribute Raman optical fiber amplifier:
determining whether a target gain is within a GAIN MASK range;
if the target gain is within the GAIN MASK range, directly locking to the target gain;
if the target gain is outside the GAIN MASK range, locking the gain to a maximum value of a corresponding GAIN MASK gain, and then gradually increasing the locked gain by a predetermined first step length until the target gain is reached or at least one pump laser reaches its maximum output power.

9. A device for dynamically controlling a gain of a Raman optical fiber amplifier, characterized in that the device comprises at least one processor and a memory communicatively connected with the at least one processor, the memory stores instructions executable by the at least one processor, and the instructions are configured in a program to carry out a method for dynamically controlling a gain of the Raman optical fiber amplifier-comprising:
setting output optical power of all pump lasers to maximum output pump power to obtain a current gain $G_M$ and a current gain slope $tilt_M$ of the Raman amplifier;
maintaining the output optical power of a specified first pump laser at the maximum output power and adjusting the output optical power of pump lasers of other wavelengths to make a gain slope of the amplifier reach a minimum slope, thereby obtaining a corresponding Raman gain $G_{NM}$ and a corresponding gain slope $tilt_{NM}$;
maintaining the output optical power of a specified second pump laser at the maximum output power and adjusting the output optical power of pump lasers of other wavelengths to make the gain slope of the amplifier reach a maximum slope, thereby obtaining a corresponding Raman gain $G_{PM}$ and a corresponding gain slope $tilt_{PM}$;
by using the gain slope as a first dimension parameter and the gain as a second dimension parameter, fitting ($tilt_{NM}$, $G_{NM}$) and ($tilt_M$, $G_M$) to obtain $K_N$ as K and $B_N$ as B in a gain calculation formula in a case of tilt <$tilt_M$, and fitting ($tilt_M$, $G_M$) and ($tilt_{PM}$, $G_{PM}$) to obtain Kp as K and Bp as B in the gain calculation formula in a case of tilt≥$tilt_M$, wherein the calculation formula is G=K*Tilt+B;
calculating maximum gains G corresponding to all the tilts of the Raman optical fiber amplifier, and forming a GAIN MASK model by using the calculated maximum gains G.

10. The system for dynamically controlling a gain of a Raman optical fiber amplifier of claim 4, characterized in that the system is further configured so that:
if the pump output power reaches the maximum output power value, the central processing unit gradually decreases the gain of the amplifier by a predetermined second step length, until an output optical power margin of each pump laser reaches a preset first value, and the gain of the Raman amplifier is locked to the gain that satisfies that the current output optical power margin of each pump laser reaches the preset first value.

11. The method for dynamically controlling a gain of a Raman optical fiber amplifier of claim 8, characterized in that:

if the pump output power reaches the maximum output power value, the gain of the amplifier is gradually decreased by a predetermined second step length until an output optical power margin of each pump laser reaches a predetermined first value, and the gain of the Raman amplifier is locked to the gain that satisfies the current output optical power margin of each pump laser reaches the predetermined first value.

* * * * *